United States Patent
Ganzhorn

[15] 3,678,174
[45] July 18, 1972

[54] SELF-LOCKING HEAT SHRINKABLE INSULATING SLEEVE

[72] Inventor: Harry E. Ganzhorn, Mountain View, Calif.

[73] Assignee: Raychem Corporation, Menlo Park, Calif.

[22] Filed: Jan. 15, 1971

[21] Appl. No.: 106,848

[52] U.S. Cl.................174/84 R, 29/628, 174/DIG. 8, 174/87, 228/56, 287/78
[51] Int. Cl..................................................H02g 15/08
[58] Field of Search..............174/84 R, 84 C, 90, 94 R, 93, 174/DIG. 8; 339/275 R; 287/78; 228/56; 29/628

[56] References Cited

OTHER PUBLICATIONS

Waddon, " Recent Developments in the Use of Polyethylene Cables for Subscribers' Lines," published in The Post Office Electrical Engineering Journal, Vol. 50, No. 4, pp. 219- 221.

*Primary Examiner*—Darrell L. Clay
*Attorney*—Lyon & Lyon

[57] ABSTRACT

An insulation sleeve of the type used to provide electrical insulation around an electrical connection is disclosed. This sleeve has at least one end which has a re-entrant configuration projecting back into the interior of the sleeve such that at least a portion of the re-entrant is held away from the inside surface of the sleeve. This provides a self-locking feature when an object of an appropriate size is inserted through this end. The sleeve may then be heat shrunk around the connection or can serve as an insulator without further recovery. The sleeve may also be provided with a solder insert. A process for fabricating such a sleeve is also disclosed. Such sleeves are particularly useful for insulating an electrical connection made by a ferrule which has been crimped over the stripped ends of insulated conductors.

18 Claims, 12 Drawing Figures

Patented July 18, 1972 3,678,174

INVENTOR.
HARRY E. GANZHORN
BY
Lyon & Lyon
ATTORNEYS.

SELF-LOCKING HEAT SHRINKABLE INSULATING SLEEVE

BACKGROUND OF THE INVENTION

The field of the invention pertains to electrical insulators and more particularly to those which are particularly useful for insulating an electrical connection made between two or more insulated conductors.

Various means have been used to insulate an electrical connection made between the stripped ends of two or more electrical conductors. Commonly used means include rigid plastic caps which are screwed onto a connection and are held thereon by internal ridges or an internal spring-like member. Another common method includes wrapping the connection with insulating tape.

Heat shrinkable sleeves have recently found wide application to insulate such a connection. Such heat shrinkable sleeves may be in the shape of a closed end cap or open cylinder which is placed over the connection and heated to cause it to shrink tightly over the connection. Sleeves are chosen of a size sufficient to extend past the bared ends of the wires and onto the wire insulation. Thus the bared conductors are covered and protected against undesired electrical contact.

The particular form of insulator depends to some extent upon the means used for connecting the bared ends of the wires. Common means for connecting wires includes twisting, soldering, or joining by crimping a ferrule over the wire ends. The connection may form a butt splice or an in line splice and this also effects the type of insulators which may be used over the connection.

Various problems are associated with the prior art means for insulating the above described connections. For instance, the use of tape is both time consuming and requires sufficient free space around the connection that the wrapping operation may be performed. Furthermore, if the wrapping is not performed properly, gaps or openings may be left which could lead to a short circuit. Still further, the tape may become unraveled thereby exposing the connection. The use of heat recoverable sleeves or caps eliminates many of these problems but unless the sleeve or cap is shrunk around the connection at the time it is placed over the connection, it may fall off or slide away from the connection prior to the heat recovery step. Furthermore, the sleeve must be properly positioned prior to recovery so that it extends past the bared conductor after recovery. Another problem is associated with the insulation of butt splices which contain a crimp ferrule. This is a nonuniformity of di-electric properties resulting from varying insulation overhang above and below the crimp ferrule.

Heat shrinkable caps with a doubled-back end portion have been utilized to form an insulator for electrical connections. The doubled back portion is fabricated in such a way that it lies flat in direct contact with the inner wall of the cylindrical portion of the cap. The function of such doubled back portion has been to hold within the cap a relatively thin-walled cylinder of a thermoplastic material whose outer diameter is essentially equal to the inner diameter of the cap. This cylinder is inserted first and the doubled back portion serves to prevent it from falling out. Such caps are not mechanically coupled to the connection prior to shrinking and will fall off if not first shrunk in place.

Another method of grasping and locating objects placed within heat recoverable members is disclosed in Ellis U.S. Pat. No. 3,525,799. There, a fusible insert having a plurality of centrally directed fingers is positioned within the heat recoverable member. This insert grasps and positions objects which are inserted into the tubular member. When the tubular member is heated, the insert melts thereby assuring that it does not inhibit the recovery of the member.

SUMMARY

It is an object of the present invention to provide an insulation sleeve which is self-locking.

Another object of the present invention is to provide an insulation sleeve for insulating a crimp ferrule over a butt splice.

Yet another object of the present invention is to provide an insulation sleeve which will give a specified overhang above and below a crimp ferrule covering a butt splice between two or more insulated conductors.

A still further object of the present invention is to provide a process for making a self-locking insulation sleeve from heat shrinkable thermoplastics.

The present invention is directed to an electrical insulation sleeve fabricated from a hollow member having one or more open ends. At least one of these open ends is bent back to form a re-entrant portion which may be frustro-conical, frustro-pyramidal or the like. Some or all of the re-entrant portion is spaced away from the inside surface of the hollow member. It thus has the ability to pass objects entering the sleeve and then spring back and mechanically hold them is place.

When the hollow member has a generally cylindrical opening and is made from a heat shrinkable thermoplastic, this re-entrant configuration can be obtained by the process of the present invention. This process involves holding an end of the cylinder against a heated surface which is maintained at a temperature sufficient to soften the thermoplastic and to cause its recovery. The contacted surface tends to recover inwardly which in turn causes a different portion of the cylinder to be contacted and softened by the heated surface. Thus, the holding of the cylinder against the heated surface results in a partial inward bending and softening. The shape of the re-entrant portion can further be controlled by separating the member from the heated surface and inserting a mandrel into the heated end. When the cylinder is then cooled, the re-entrant portion will maintain the shape given to it by the mandrel.

When the re-entrant portion is rectangular in shape, the wider sides of the rectangle are further away from the inner walls of the cylinder than the shorter sides of the rectangle. This results in an increased amount of flexibility or spring-back permitting a substantial variety of sizes of objects to be inserted and held by the insulation sleeve. The amount of spring-back may also depend on the shape of the inserted object. For instance, a rectangular opening will spring back when a cylindrically shaped object is inserted therethrough and a conical shape will spring-back when an article with a rectangular cross section is inserted therein. Also, by further increasing the wide sides of the rectangle, the wall thickness of the re-entrant at the opening is decreased causing the re-entrant to be even more flexible. To further alter the spring-back, the opening may be made having a star shaped re-entrant having three or more rounded points. When the insulation sleeve is utilized to insulate crimped butt splices, the sleeve itself should, of course be large enough to accommodate the ferrule and yet the re-entrant portion should be deflected by the insertion of the ferrule. The frustro-pyramidal shape is particularly useful for this application. When one pair of sides of the pyramid is relatively small as compared to the other pair of sides, a particularly useful sleeve results. When one side of the base of the pyramid is at least two times the length of its adjacent side, a number of different sizes may be readily held thereby. By increasing this ratio to four or more further increases the flexiblity of the bent back portion.

By bending back both ends of a short length of a cylinder, a particularly effective insulation sleeve results. While one end functions as a self-locking entry port, the other end can operate as a stop. Thus, if a crimp ferrule of an appropriate size is inserted through one end, it spreads apart the re-entrant portion until the wide portion of the ferrule has cleared it. This re-entrant portion then springs back against the conductors and any attempt to withdraw the sleeve from the ferrule is prevented by the abutment of the ferrule end with the end of the re-entrant portion. Similarly, any attempt to further insert the ferrule into the sleeve results in a contact with the re-entrant portion at the other end of the cylinder. Thus the sleeve is held over the ferrule and existing from either direction is prohibited. The sleeve thus forms an insulator by itself without further processing or it may be further heat shrunk about the ferrule.

The insulation sleeve of the present invention may be made with a fusible insert. Such inserts are disclosed in Wetmore U.S. Pat. No. 3,243,211, the disclosure of which is incorporated by reference herein. In this patent heat unstable members such as sleeves are disclosed which contain a ring or ball-shaped solder insert. Conductors may be placed therein and when the sleeve is heated to cause a dimensional change, the solder melts and flows around the conductors. The use of a ring of solder within an insulation sleeve having a re-entrant portion at each end results in a particularly useful connector. An insulted conductor with a bared end may be inserted into either end of the sleeve. The re-entrant portion grasps the conductor and prevents the sleeve from falling off. The other end of the sleeve functions as a stop for the end of the conductor. A second insulated conductor with a bared end can then be inserted either in the same end or on the other end and similarly stopped by a re-entrant portion. The sleeve may then be heated to cause recovery and melting of the solder and a subsequent joining of the conductors. The re-entrant portion further tends to form an effective dam thereby preventing the escape of melted solder. Of course, if the two conductors were to be inserted in one end, they could be twisted together to improve the locking operation of the sleeve.

DESCRIPTION OF THE PREFERRED EMBODIMENTS

Figure 1:
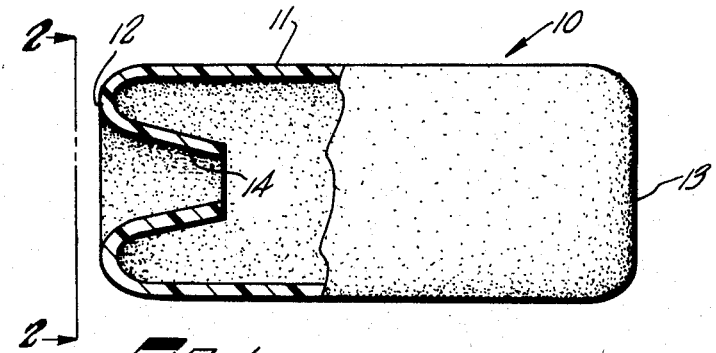
FIG. 1 is a side elevation, partially cut away, of the self-locking heat shrinkable insulating sleeve of the present invention.

A sleeve of the present invention is shown in FIG. 1 and indicated generally by the number 10. The sleeve is fabricated from a cylinder of heat shrinkable material 11. The two ends 12 and 13 of sleeve 10 are open and have been turned or bent back to form a re-entrant portion 14.

Figure 2:
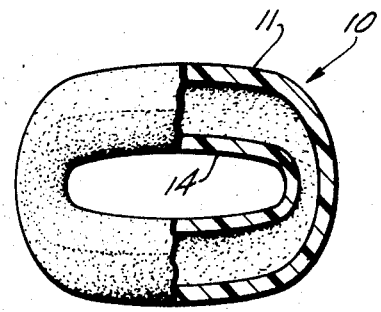
FIG. 2 is an end view, partially cut away, of the sleeve of FIG. 1.

As shown in FIG. 2, re-entrant portion 14 is generally rectangular in configuration which results in it having increased flexibility near the center of the sleeve of FIG. 2.

Figure 3:
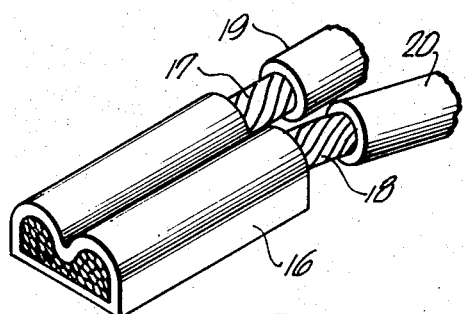
FIG. 3 is a perspective view of a ferrule crimped about the stripped ends of two insulated, stranded conductors.

FIG. 3 shows a conventional ferrule 16 which has been crimped about the stripped ends 17 and 18 of insulated conductors 19 and 20. Typically, ferrule 16 is made from a ductile metal which is crimped or bent around two or more conductors thereby forming a secure physical and electrical connection between the conductors.

Figure 4:
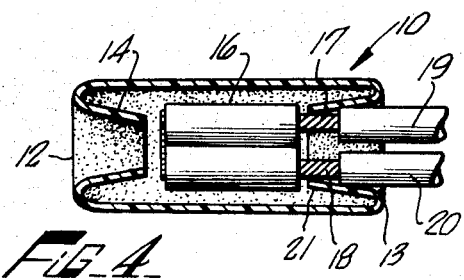
FIG. 4 is a plan view, partly in cross-section, of the sleeve of the present invention placed over the crimpled ferrule of FIG. 3.

FIG. 4 shows the sleeve of FIGS. 1 and 2 in position over the crimped ferrule and conductors of FIG. 3. The ferrule 16 has been inserted in end 13 of sleeve 10. End 13 has a re-entrant portion 21. The size of the sleeve 10 and the ferrule 16 are such that the ferrule will distend and pass through the re-entrant portion 21, but once inside the sleeve will be held or locked in place by the re-entrant portion 21. This self-locking feature results from the flexibility of the re-entrant portion 21. Note also that re-entrant portion 14 serves to provide a stop for ferrule 16 to prevent its further insertion into sleeve 10. As shown in FIG. 4, self-locking sleeve 10 provides effective insulation of ferrule 16 and the bare wires 17 and 18 from undesirable electrical contact.

Figure 5:
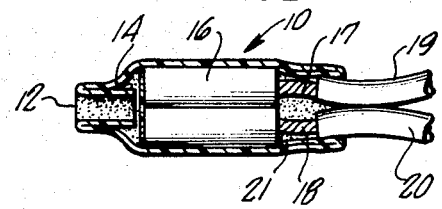
FIG. 5 shows the sleeve of FIG. 4 after shrinking.

Self-locking insulation sleeve 10 can be more firmly secured to ferrule 16 by a heat-shrinking step. As shown in FIG. 5, sleeve 10 has been heat shrunk about ferrule 16 thereby resulting in a more secure gripping of sleeve 10 about ferrule 16.

Figure 6:
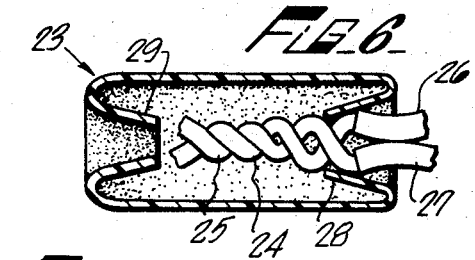
FIG. 6 is a plan view, partly in cross-section, showing the sleeve of the present invention as applied to the twisted, stripped ends of two insulated conductors.

FIG. 6 shows a self-locking heat-shrinkable insulation sleeve 23 placed over the twisted ends 24 and 25 of conductors 26 and 27. Re-entrant 28 contacts conductors 24 and 25 and holds sleeve 23 about the bared twisted ends. Re-entrant 29 forms a stop to prevent further insertion of the conductors into the sleeve. The shape of the re-entrant portion should be selected so that it is flexed outwardly by the insertion of the twisted ends. For instance, the re-entrant portion could be pyramidal in configuration and have a relatively narrow, slit-like opening which would be forced apart by the insertion of the twisted ends.

Figure 7A:
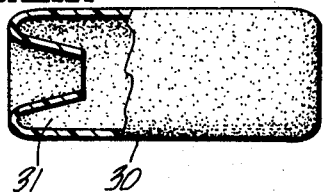
FIGS. 7a and 7b are a side view, partially cut away, and an end view of one configuration of the sleeve of the present invention.
Figure 7B:
Figure 8A:
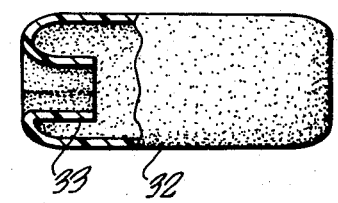
FIGS. 8a and 8b are a side view partially cut away and an end view showing another configuration of the sleeve of the present invention.
Figure 8B:

FIGS. 7a and 7b show a self-locking sleeve similar to that shown in FIGS. 1 and 2 but with a re-entrant portion of different configurations. As can be seen, sleeve 30 has a conical re-entrant portion 31 with a circular opening. FIGS. 8a and 8b show a sleeve 32 having a re-entrant portion 33 with a generally star shaped opening. Such a shape would permit a relatively large deformation when a circular member is inserted therein.

Figure 9:
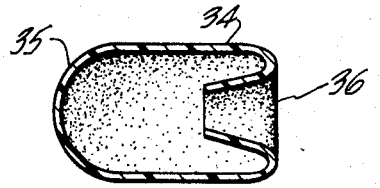
FIG. 9 is a cross-sectional side view of another configuration of the sleeve of the present invention.

FIG. 9 shows a sleeve 34 having a closed end 35 to form an end cap. End 36 has a re-entrant portion as described above.

Figure 10:
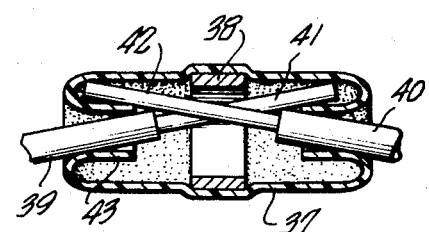
FIG. 10 is a side view partly in cross-section showing the sleeve of the present invention containing a solder ring and further showing the stripped ends of two insulated conductors inserted therein.

FIG. 10 shows a sleeve 37 of the present invention containing a solder insert in the form of a ring 38. The stripped end 41 of insulated conductor 39 is inserted into one end of sleeve 37. Conductor 40 having stripped end 42 is inserted in the other end of sleeve 37. The size and shape of the re-entrant portions 43 and 44 are preferably chosen so that they firmly grasp insulated conductors 39 and 40 and hold them within the sleeve. In use, the assembly is heated causing solder ring 38 to melt and form an electrical connection between the conductors and further causing the sleeve 37 to shrink about the conductors and insulate the connection. Of course, a solder insert could be used with the various other configurations illustrated.

Various materials and methods can be used to fabricate heat shrinkable hollow members. In general, such members or sleeves are made of a material capable of having the property of plastic or elastic memory imparted thereto and are expanded under heat and pressure to a diameter greater than their normal diameter and cooled while under pressure. A sleeve treated in this manner will retain its expanded position until it is again heated to about its heat recovery temperature at which time it will recover to its original shape. Examples of materials useful in forming such dimensionally heat unstable recoverable members may be found in Currie U.S. Pat. No. 2,027,962 and Cook et al., U.S. Pat. No. 3,086,242 the disclosures of which are incorporated herein by reference. Polymeric material which have been cross-linked by chemical means or by irradiation, for example, with high energy electrons or nuclear radiation, such as those disclosed in the Cook et al., patent, are preferred for use in the present invention. Non-crystalline polymeric materials exhibiting the property of plastic or elastic memory, such as polyurethane, inomers, etc., could also be used in practicing the present invention. The connector of the present invention is equally useful with sleeves made from material having either plastic or elastic memory; consequently, as used herein, the term "elastic memory" and "plastic memory" are used interchangeably and are intended to be mutually inclusive.

Where the object to be insulated has an enlarged portion such as a ferrule, a protruding twist of wire, or or the like, the sleeve may be utilized without subsequent heat recovery. The mechanical lock alone provides enough retentive force to ensure proper insulation. The amount or length of the re-entrant portion forms an important aspect of the present invention. This re-entrant portion should be sufficient to hold a part inserted therein in a desired position. For instance, if the object to be insulated is a crimp ferrule where the insulator has been stripped at a distance extending away from the ferrule, the re-entrant portion should extend a distance sufficient to ensure that the sleeve covers the bared wire extending from the ferrule. Furthermore, in order to obtain the maximum advantage of the self-locking feature of the present invention, it is desirable that the extent of the inward extension of the re-entrant portion be between one-third and two times the outside diameter of the cylindrical sleeve. Preferably the re-entrant portion should extend between one-half and one times the outside diameter.

When the hollow member is a cylinder, and the re-entrant portion is in some shape other than a cone, the spacing between the inner wall of the cylinder and the re-entrant portion will not be constant. The important dimension which relates to the snap-back feature of the present invention is thus not the minimum but the maximum spacing between the inner cylinder wall and the re-entrant portion. This spacing should be at least equal to the wall thickness of the cylindrical member and may readily be greater than that. The spacing may be so great that the opposite sides of the re-entrant portions touch.

An insulating sleeve of the present invention was made by the following process. A one-inch sleeve of heat-shrinkable irradiated polyolefin tubing having a wall thickness of 0.01 inches was cut from tubing expanded to an outside diameter of one-fourth inch in the manner disclosed in the Cook U.S. Pat. No. 3,086,242. One end of this sleeve was placed in contact with a heated surface maintained at the shrink temperature of the sleeve. A light pressure was maintained against the heated surface. The contacted end began to soften and shrink and turn inwardly thereby exposing a different portion of the wall. After approximately three-sixteenths inch length of the original cylinder had thus been softened the cylinder was separated from the heated surface and a steel mandrel was inserted in the heated end. The mandrel was rectangular in cross-section and functioned to shape the re-entrant and further to act as a heat sink to cool the re-entrant. The other end of the cylinder was then treated in the same manner. The resulting self-locking heat shrinkable insulation sleeve had a re-entrant portion, the inner opposing edges of which were essentially touching and were spaced a maximum of about one-sixteenth of an inch from the inner wall. This sleeve was then placed over a crimp ferrule which covered a butt splice between the bared ends of a two insulated copper wires. The ends of the insulation were one-eighth inch from the ferrule so that after it had been inserted in the sleeve, no bare wire extended beyond the end of the sleeve. The sleeve was then heated to its heat recovery temperature causing it to shrink about the ferrule and resulting in a securely insulated connection.

Although the present invention has been discussed laregely with regard to cylindrical sleeves, it is equally applicable to hollow members other than cylinders. The cross-section of the member could be square, rectangular, eliptical or the like. The hollow member could form a tee, cross, elbow or other shapes. Furthermore, the insulating member may have a re-entrant portion at one opening and other openings may be left in their original configuration. The sleeves of the present invention may, of course, be used to cover and protect any desired object or objects not just electrical connections. The invention thus may be embodied in other specific forms not departing from the spirit or central characteristics thereof. The present embodiments are therefore to be considered in all respects as illustrative and not restrictive.

What is claimed is:
1. A sleeve formed of heat shrinkable material comprising:
 a hollow heat shrinkable polymeric member having at least one open end and having an integral re-entrant portion projecting back into the interior of the sleeve at said open end at least a portion of said re-entrant portion being displaced from the inner surface of said hollow member.
2. The sleeve of claim 1 wherein said hollow member has two open ends.
3. The sleeve of claim 1 wherein said re-entrant means is generally pyramidal in shape and has a generally rectangular opening therein.
4. The sleeve of claim 3 wherein the width of said rectangular opening is at least 2 times its height.
5. The sleeve of claim 1 wherein said re-entrant means is generally conical in shape and has a generally circular opening therein.
6. The sleeve of claim 1 wherein said hollow member is cylindrical.
7. The sleeve of claim 1 wherein said hollow member is fabricated from a heat recoverable irradiated polyolefin.
8. The sleeve of claim 1, wherein a fusible insert is positioned within said hollow member.
9. The sleeve of claim 8 wherein said fusible insert comprises solder.
10. The sleeve of claim 6 wherein one end of said cylindrical body is closed.
11. The sleeve of claim 1 wherein said hollow member has a plurality of open ends and more than one of said open ends is provided with the defined re-entrant means.
12. The sleeve of claim 1 wherein said re-entrant portion projects back into the interior of said sleeve a distance of between one-third and two times the outside diameter of said hollow member.
13. The sleeve of claim 1 wherein said re-entrant portion is displaced from said inner surface of said hollow member a distance at least equal to the wall thickness of said cylindrical member.
14. A self-locking insulation sleeve for electrically insulating a junction between the stripped ends of at least two insulated conductors comprising:
 a hollow heat shrinkable polymeric member having at least one open end and having an integral re-entrant portion projecting back into the interior of the sleeve at said open end at least a portion of said re-entrant portion being displaced from the inner surface of said hollow member, said re-entrant portion being shaped so that it is radially displaced by the insertion of said junction.
15. The sleeve of claim 14 wherein said hollow member has two open ends provided with the defined re-entrant means.
16. The sleeve of claim 14 wherein said hollow member has one open end.
17. The sleeve of claim 14 wherein a fusible insert is positioned within said hallow member.
18. A process for making a self-locking insulation sleeve from a generally cylindrical hollow member fabricated from a heat recoverable thermoplastic resin, comprising:
 holding an end of said member against a heated surface having a temperature at least equal to the heat recovery temperature of said resin for a time sufficient to raise the temperature of the end of the member to said heat recovery temperature and to form said end inwardly;
 separating the member from contact with said heated surface;
 inserting a shaped mandrel into said heated end and forming said heated end into a shaped, re-entrant configuration;
 cooling said heated end, and
 removing said mandrel.

* * * * *